United States Patent [19]

Amundson, Jr.

[11] Patent Number: 5,436,206
[45] Date of Patent: Jul. 25, 1995

[54] CHAMPAGNE COLORED GLASSES

[75] Inventor: W. Duane Amundson, Jr., Corning, N.Y.

[73] Assignee: Corning Incorporated, Corning, N.Y.

[21] Appl. No.: 258,268

[22] Filed: Jun. 10, 1994

[51] Int. Cl.$^6$ ............................................. C03C 3/087
[52] U.S. Cl. ........................................ 501/71; 501/72
[58] Field of Search ................................. 501/71, 72

[56] References Cited

U.S. PATENT DOCUMENTS

| | | |
|---|---|---|
| 2,524,719 | 11/1946 | Tillyer . |
| 2,938,808 | 5/1960 | Duncan et al. . |
| 3,024,121 | 3/1962 | Hagedorn . |
| 4,190,452 | 2/1980 | Fischer et al. . |
| 5,070,043 | 12/1991 | Amundson, Jr. et al. ........ 501/71 X |
| 5,070,048 | 12/1991 | Boulos et al. ................... 501/71 |

FOREIGN PATENT DOCUMENTS 2082647  12/1971  France .................. 501/71

OTHER PUBLICATIONS

W. A. Weyl, "Coloured Glasses", published by Society of Glass Technology, Thornton, 20 Hallam Gate Road, Sheffield, Sio 5BT, England, first published 1951, republished 1976, Chapters VII, VIII, XIII, XIV.

Primary Examiner—Karl Group
Attorney, Agent, or Firm—Angela N. Nwaneri

[57] ABSTRACT

This invention is directed to the production of a transparent glass which, in a thickness of 4 mm, exhibits a champagne color as defined by chromaticity coordinates (Illuminant C) within the ranges

| x | 0.3166–0.3281 |
|---|---|
| y | 0.3211–0.3305 |
| Y | 77–88, | said glass consisting essentially, by weight, of 0.05–0.25% iron oxide, expressed in terms of $Fe_2O_3$, >25–175 ppm nickel oxide, expressed in terms of NiO, and >10–100 ppm Se in a soda lime silicate base composition.

2 Claims, 1 Drawing Sheet

CHAMPAGNE COLORED GLASSES

RELATED APPLICATION

U.S. application Ser. No. 08/258,271, filed concurrently herewith by S. L. Hagg, R. W. Pfitzenmaier, and C. C. Smith under the title CHAMPAGNE COLORED GLASS-CERAMICS and assigned to the same assignee as the present application, is directed to the production of transparent glass-ceramic articles exhibiting a champagne tint. A color package is disclosed that imparts a champagne tint in transparent glass-ceramic materials containing $\beta$-quartz solid solution as the predominant crystal phase. The color package includes $Al_2O_3$, $Li_2O$, $Fe_2O_3$, and $Co_3O_4$ within restricted intervals.

FIELD OF THE INVENTION

The field of the invention is the production of clear, transparent glasses having compositions within the base soda lime silicate system exhibiting a particular color.

BACKGROUND OF THE INVENTION

Baking ware or ovenware prepared from glass has been available for use in the kitchen for over 75 years under the trademark PYREX ®. Initially, the ware was formed from a clear, colorless borosilicate glass. To satisfy the consumers' demand for color, opal ovenware was developed that could be decorated either in solid colors or in patterns of colors. Recently, a clear, transparent glass ovenware exhibiting a brown tint was introduced under the trademark FIRESIDE ®. That product comprises a clear, transparent borosilicate base composition containing a color "package" consisting of cobalt, nickel, and manganese oxides in strictly-defined proportions.

Culinary ware prepared from glass has generally been limited to use in an oven. In 1960, however, Corning Glass Works (now Corning Incorporated), Corning, New York, introduced a white, opaque, glass-ceramic cookware product under the trademark CORNING WARE ® which can be used on the burners on top of a stove, as well as in the oven. Subsequently, color packages have been incorporated into the base compositions therefor, and other opaque glass-ceramic cookware and dinnerware products of different base compositions with different color packages have been devised. More recently, the same company introduced a clear, transparent glass-ceramic cookware product exhibiting a light brown tint under the trademark VISIONS ® which can also be used on top of the stove, as well as in the oven.

Whereas those glass-ceramic cookware products have performed very satisfactorily, there has been perceived need to increase the palette of colors, particularly in the field of transparent ware. Consumer focus groups and marketing trends in general have indicated that today's cookware customers are looking for softer, i.e., less intense, and more neutral colors in their selections for the kitchen. As a result of consumer surveys, it was determined that there was a preference for transparent cookware exhibiting a color comprising a soft yellow with pink overtones. Because a tint having a name carrying a measure of sophistication was desired, the color was chosen after comparing the hues of a number of champagnes such that it can validly be called "champagne".

Those consumer surveys motivated the development of glass-ceramic culinary ware displaying a champagne tint. That ware is described in Ser. No. 08/258,271, supra. As can be appreciated, that development of transparent glass-ceramic cookware exhibiting a champagne tint resulted in the need for coordinating and complementing glassware. Most critically, glass covers were needed to coordinate with the cookware. Although lids for glass-ceramic culinary ware can be fashioned from the glass-ceramic, because the lids, whether used on ware in an oven or on top of stove burners, do not receive the thermal shocks, the mechanical impacts, and abrasive treatments to which the glass-ceramic cookware can be exposed, and because glass parts can be designed, produced, and decorated more rapidly and less expensively than the same parts shaped from a glass-ceramic, covers for culinary ware have generally been formed from glass.

Therefore, the principal objective of the present invention was to develop champagne tinted glassware suitable for use as service ware, tableware, drinkware, and as covers for glass-ceramic cookware to be used in an oven or on top of stove burners.

SUMMARY OF THE INVENTION

That objective can be achieved in a transparent glass exhibiting a champagne tint, the glass consisting essentially of about 0.05–0.25% by weight iron oxide, expressed in terms of $Fe_2O_3$, >25–175 ppm (parts per million) nickel oxide, expressed in terms of NiO, and >10–100 ppm Se in a soda lime silicate ($Na_2O$—$CaO$—$SiO_2$) base composition, the glass exhibiting chromaticity coordinates, utilizing Illuminant C, encompassed within the ranges

| x | 0.3166–0.3281 |
|---|---|
| y | 0.3211–0.3305 |
| Y | 77–88, | and having impurity levels for manganese oxide, expressed in terms of $MnO_2$, for cobalt oxide, expressed in terms of $Co_3O_4$, for molybdenum oxide, expressed in terms of $MoO_3$, and for chromium oxide, expressed in terms of $Cr_2O_3$, not exceeding 0.05% by weight, 5 ppm, 20 ppm, and 10 ppm, respectively. The inventive color package can be employed where the colorants are incorporated as constituents in the glass batch, and have been deemed to be compatible with color cell introduction where the colorants are added as concentrates (bonded oxides) or premelted frits in a stirred forehearth channel.

The level of iron, expressed in terms of $Fe_2O_3$, will be maintained below 0.3% not only to assure the development of desired colorations, but also because higher levels can lead to difficulties in melting the glass batches. The inventive color package is particularly advantageous from two practical points of view. First, the batches do not contain highly toxic materials and, second, the batches do not require melting, fining, or forming under reducing conditions.

The preferred color pages will consist of about 0.125–0.175% $Fe_2O_3$, 50–100 ppm Se, and >25–100 ppm NiO.

BRIEF DESCRIPTION OF THE DRAWING

The appended drawing comprises a plot of x, y chromaticity coordinates on a color mixture diagram utilizing Illuminant C.

PRIOR ART

Figure 1:
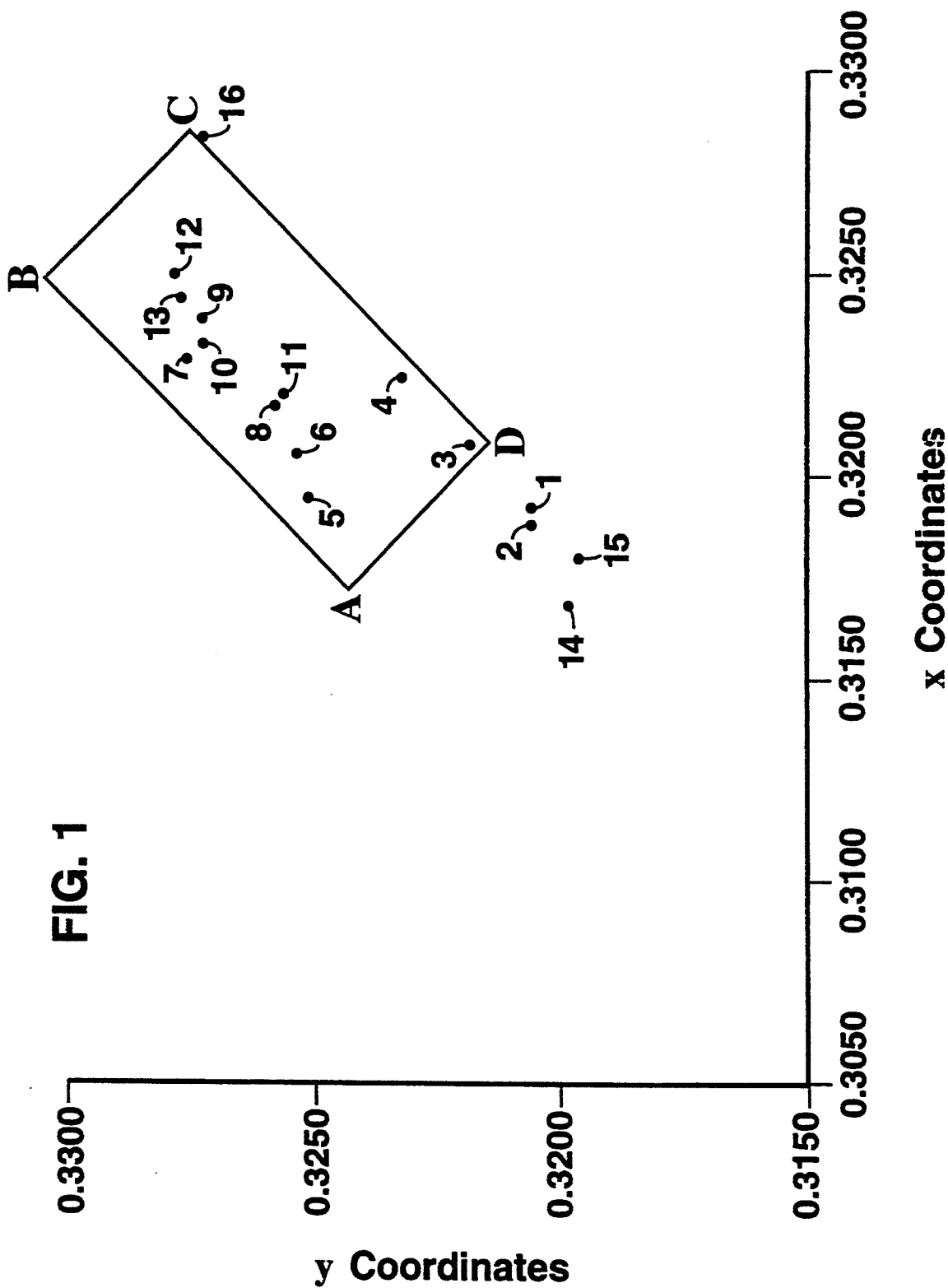

The art of decorating glass, including the incorporation of colorants into the base glass composition, has quite likely been practiced since the earliest formation of glass articles. Probably the best known treatment of the art of coloring glasses is the monograph of W. A. Weyl, "Coloured Glasses", published by Dawsons of Pall Mall, London, England, in 1951. Weyl devotes several chapters and parts of chapters to discussing the colors produced through the presence of iron oxide (Chapter VII), nickel oxide (Chapter XIII), and selenium (Chapter XVIII), respectively, in various glass compositions. No reference was found therein, however, to a combination of iron oxide, nickel oxide, and selenium to develop a champagne tint in a glass, i.e., a tint comprising a soft yellow hue with pink overtones.

U. S. Pat. No. 2,524,719 (Tillyer) discloses glasses designed to absorb radiation in both the ultraviolet and infrared portions of the radiation spectrum. The glasses exhibited a warm rose smoke shade or color imparted thereto through the presence of 1.5–5% by weight iron oxide and 0.001–0.1% by weight selenium in a soda lime silicate base glass composition. Nickel oxide is noted as being an optional component and is included in one example provided by Tillyer at a concentration of 0.26% by weight (2600 ppm). Both the iron oxide and nickel oxide contents far exceed those operable in the subject inventive glasses.

U. S. Pat. No. 2,938,808 (Duncan et al.) describes neutral gray colored, heat absorbing glasses having base compositions within the soda lime silicate system which are colored through the inclusion, in weight percent, of 0.2–1% $Fe_2O_3$, 0.003–0.05% NiO, 0.003–0.02% CoO, and 0.003–0.2% Se. Cobalt oxide comprises no part of the present inventive color package and the iron oxide level generally exceeds that which is operable in the subject inventive glasses.

U.S. Pat. No. 3,024,121 (Hagedorn) is directed to the production of colored glasses via the forehearth addition of a highly enriched colorant frit to a colorless molten base glass. The patent refers to "milk bottle pink containers consisting of a base soda lime silicate glass to which 0.00025–0.00035% by weight (2.5–3.5 ppm) Se and <0.04% by weight $Fe_2O_3$ are included. That base glass composition was used to formulate glasses exhibiting various shades of green, including champagne green. All of these latter glasses contained chromium oxide to impart the desired tint. Even ignoring the presence of chromium oxide, none of the examples provided in the patent contained iron oxide, nickel oxide, and selenium in the concentrations required in the instant inventive glasses.

U.S. Pat. No. 4,190,452 (Fischer et al.) is drawn to glasses having compositions within the base soda lime silicate system which contain, in weight percent, 0.2–0.5% $Fe_2O_3$, 0–0.0025% (0–25 ppm) NiO, and 0.0005–0.0025% (5–25 ppm) Se as colorants to develop a bronze tint therein. As can be observed, the $Fe_2O_3$ content is generally higher and the NiO content is lower than are required in the subject inventive glasses.

DESCRIPTION OF PREFERRED EMBODIMENTS

A typical, colorless, soda lime silicate glass marketed by Corning Incorporated as Corning Code 0281 glass was selected as a base glass. That glass has the following approximate composition, expressed in terms of parts by weight on the oxide basis. Because the sum of the individual components closely approximates 100, for all practical purposes the values recorded below can be deemed to represent weight percent.

| $SiO_2$ | 74 | $Sb_2O_3$ | 0.02 |
| --- | --- | --- | --- |
| $Na_2O$ | 12.95 | $Fe_2O_3$ | 0.03 |
| CaO | 9.50 | $K_2O$ | 0.35 |
| $Al_2O_3$ | 1.69 | $Li_2O$ | 0.02 |

The identities of the batch ingredients for preparing the base glass are not critical. It is only necessary that, when the batch materials are melted together, they are converted into the desired oxides in the proper proportions. The actual batch materials used in preparing the base glass are recited below.

| Sand | Sodium Nitrate |
| --- | --- |
| Aragonite | Sodium Sulfate |
| Lithospar | Sodium Antimonate |
| Sodium Carbonate | |

The following table reports a number of sample compositions, expressed in terms of parts by weight on the oxide basis (except for Se) as calculated from the batch. Again, inasmuch as the total of the components closely approximates 100, for all practical purposes the values listed may be considered to reflect weight percent. The glasses were produced by compounding the batch constituents, ballmilling the constituents together to assist in securing a homogeneous melt, and then charging the batch mixtures into silica crucibles. Color batches consisting of dilutions of colorants in very pure sand ranging between 1–10% by weight colorant levels were utilized when the desired concentrations of colorants were calculated to be less than 0.1 gram. The crucibles were moved into a gas-fired furnace containing a 4% by volume excess oxygen atmosphere operating at about 1500° C. After a residence time of 8 hours, the melts were poured into steel molds to form glass slabs having dimensions of about 20.32×10.16×1.91 cm (8"×4"×0.75") and those slabs were transferred immediately to an annealer operating at about 550° C.

Samples having dimensions of about 5.08×5.08×0.4 cm (2"×2"×4 mm) were cut from the slabs and polished on both faces. The samples were labeled with a high temperature marker and thermally tempered in a laboratory tempering furnace. The tempering procedure involved heating the samples to about 650° C., holding at that temperature for three minutes, and then subjecting the sample to a blast of chilled air.

It must be recognized that the above description reflects laboratory activity only. That is, the batches for the inventive glasses can be melted in large commercial melting units and those melts formed into desired glass shapes utilizing commercial glass forming techniques and equipment. It is only necessary that the batch be heated to a sufficiently high temperature for a sufficient period of time to obtain a homogeneous melt, and that melt thereafter cooled and simultaneously shaped into a glass body at a sufficiently rapid rate to avoid the development of devitrification. The tempering process will likewise be carried out employing techniques and equipment conventional in the commercial glass tempering practice.

The loss during melting of the batch of all of the components except selenium can be ignored. Volatilization of selenium during melting, however, is quite substantial, commonly at least 50% and sometimes up to 75% being lost. Hence, to assure a selenium content of about 50–100 ppm in the final glass, a minimum batched level of at least 100 ppm is required.

The following table also includes the batched concentrations of the colorants along with the chromaticity coordinates measured on the tempered samples. The x and y chromaticity coordinates are also plotted in the "color box" ABCDA comprising the appended drawing. The vertices A,B,C, and D exhibit the following x, y coordinates:

A [x = 0.3166; y = 0.3241]
B [x = 0.3244; y = 0.3305]
C [x = 0.3281; y = 0.3275]
D [x = 0.3204; y = 0.3211]

| | 1 | 2 | 3 | 4 | 5 | 6 | 7 | 8 | 9 |
|---|---|---|---|---|---|---|---|---|---|
| $Fe_2O_3$ | 0.1% | 0.1% | 0.1% | 0.1% | 0.15% | 0.15% | 0.15% | 0.15% | 0.15% |
| Se | 200 ppm | 200 ppm | 200 ppm | 200 ppm | 75 ppm | 75 ppm | 75 ppm | 100 ppm | 100 ppm |
| NiO | — | 25 ppm | 50 ppm | 100 ppm | 30 ppm | 50 ppm | 70 ppm | 30 ppm | 50 ppm |
| $Co_3O_4$ | — | — | — | — | 1 ppm | 1 ppm | 1 ppm | 1 ppm | 1 ppm |
| $MnO_2$ | — | — | — | — | 100 ppm | 100 ppm | 100 ppm | 100 ppm | 100 ppm |
| $MoO_3$ | — | — | — | — | 5 ppm | 5 ppm | 5 ppm | 5 ppm | 5 ppm |
| $Cr_2O_3$ | — | — | — | — | 5 ppm | 5 ppm | 5 ppm | 5 ppm | 5 ppm |
| x | 0.3188 | 0.3184 | 0.3202 | 0.3220 | 0.3200 | 0.3189 | 0.3224 | 0.3212 | 0.3234 |
| y | 0.3202 | 0.3203 | 0.3216 | 0.3230 | 0.3251 | 0.3249 | 0.3274 | 0.3255 | 0.3271 |
| y | 85.6 | 84.3 | 82.5 | 79.4 | 80.3 | 80.2 | 77.8 | 79.6 | 77.8 |

| | | 10 | 11 | 12 | 13 | 14 | 15 | 16 |
|---|---|---|---|---|---|---|---|---|
| | $Fe_2O_3$ | 0.15% | 0.15% | 0.15% | 0.15% | 0.1% | 0.1% | 0.3% |
| | Se | 100 ppm | 125 ppm | 125 ppm | 125 ppm | 100 ppm | 200 ppm | 200 ppm |
| | NiO | 70 ppm | 30 ppm | 50 ppm | 70 ppm | — | — | — |
| | $Co_3O_4$ | 1 ppm | 1 ppm | 1 ppm | 1 ppm | | | |
| | $MnO_2$ | 100 ppm | 100 ppm | 100 ppm | 100 ppm | | | |
| | $MoO_3$ | 5 ppm | 5 ppm | 5 ppm | 5 ppm | | | |
| | $Cr_2O_3$ | 5 ppm | 5 ppm | 5 ppm | 5 ppm | | | |
| | x | 0.3229 | 0.3214 | 0.3245 | 0.3239 | 0.3168 | 0.3180 | 0.3283 |
| | y | 0.3271 | 0.3254 | 0.3276 | 0.3275 | 0.3179 | 0.3194 | 0.3275 |
| | Y | 77.7 | 79.5 | 77.4 | 77.0 | 85.9 | 85.4 | 76.1 |

As can be discerned from the above table, the champagne tint color package is relatively stable in that the additions of $MnO_2$, $Co_3O_4$, $MoO_3$, and $Cr_2O_3$ do not affect the color significantly.

The criticality of composition control is evidenced through Examples 1, 2, 14, and 15, the glasses having compositions close to, but outside of, the required ranges. Thus, a small change in the components of the color package can produce a sharp change in the color and/or transmission exhibited by the glass.

Example 6 is considered to be the best embodiment of the inventive glasses.

I claim:

1. A transparent glass which, in a thickness of 4 mm, exhibits a champagne color as defined by chromaticity coordinates (Illuminant C) within the ranges

| x | 0.3166–0.3281 |
|---|---|
| y | 0.3211–0.3305 |
| Y | 77–88, | said glass consisting essentially, by weight, of 0.05–0.25% iron oxide, expressed in terms of $Fe_2O_3$, >25–175 ppm nickel oxide, expressed in terms of NiO, >10–100 ppm Se in a soda lime silicate base composition, and having $Co_3O_4$ not exceeding about 5 ppm.

2. A transparent glass which, in a thickness of 4 mm, exhibits a champagne color as defined by chromaticity coordinates (Illuminant C) within the ranges

| x | 0.3166–0.3281 |
|---|---|
| y | 0.3211–0.3305 |
| Y | 77–88, | said glass consisting essentially, by weight, of 0.05–0.25% iron oxide, expressed in terms of $Fe_2O_3$, >25–175 ppm nickel oxide, expressed in terms of NiO, and >10–100 ppm Se in a soda lime silicate base composition, and having impurity levels for $MnO_2$, $Co_3O_4$, $MoO_3$, and $Cr_2O_3$ not exceeding about 500 ppm, 5 ppm, 20 ppm and 10 ppm, respectively.

* * * * *